W. F. DAVIS.
EXPLOSION MOTOR FOR CARS AND THE LIKE.
APPLICATION FILED OCT. 10, 1905.
1,079,220. Patented Nov. 18, 1913.
7 SHEETS—SHEET 1.
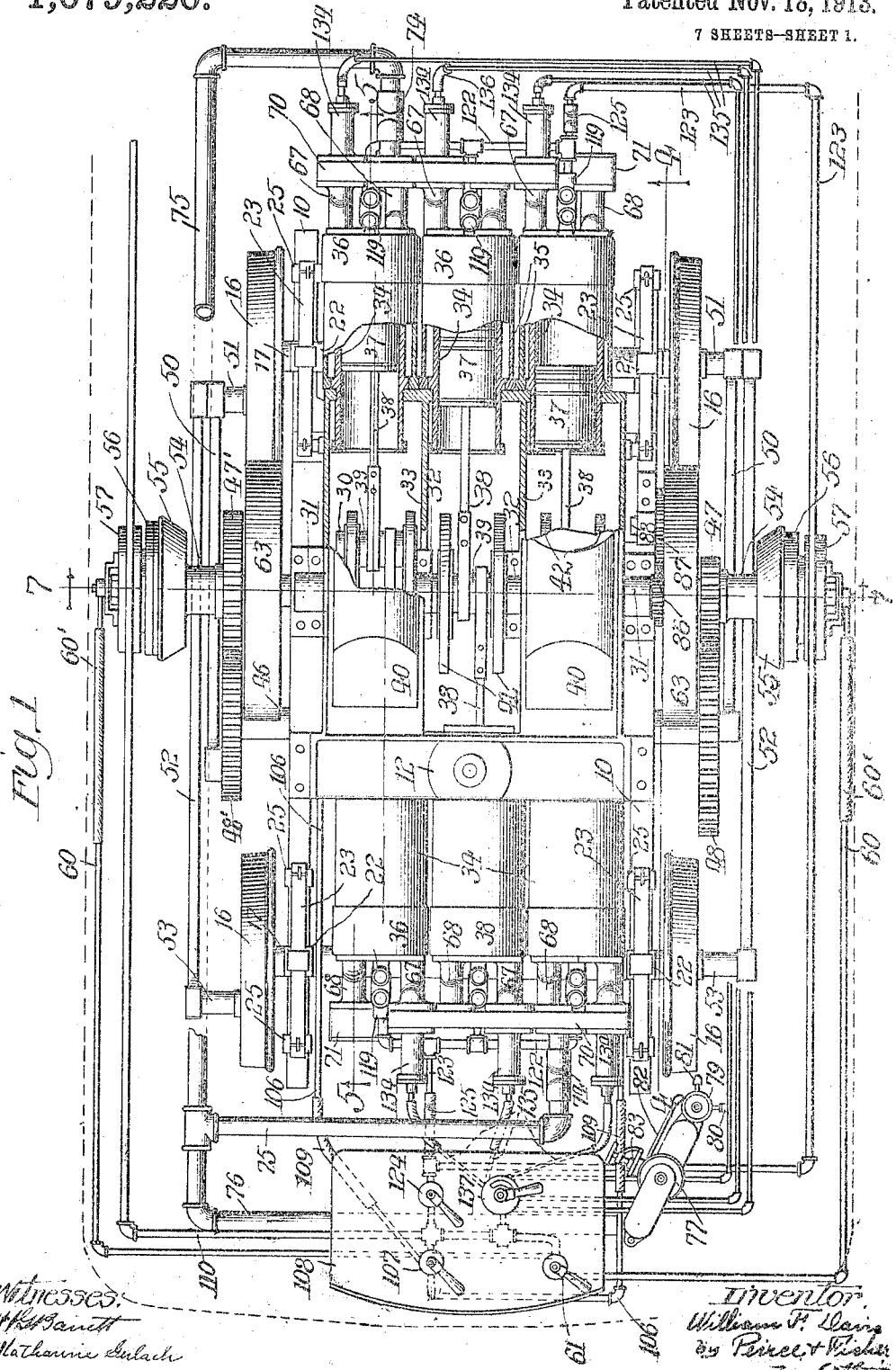

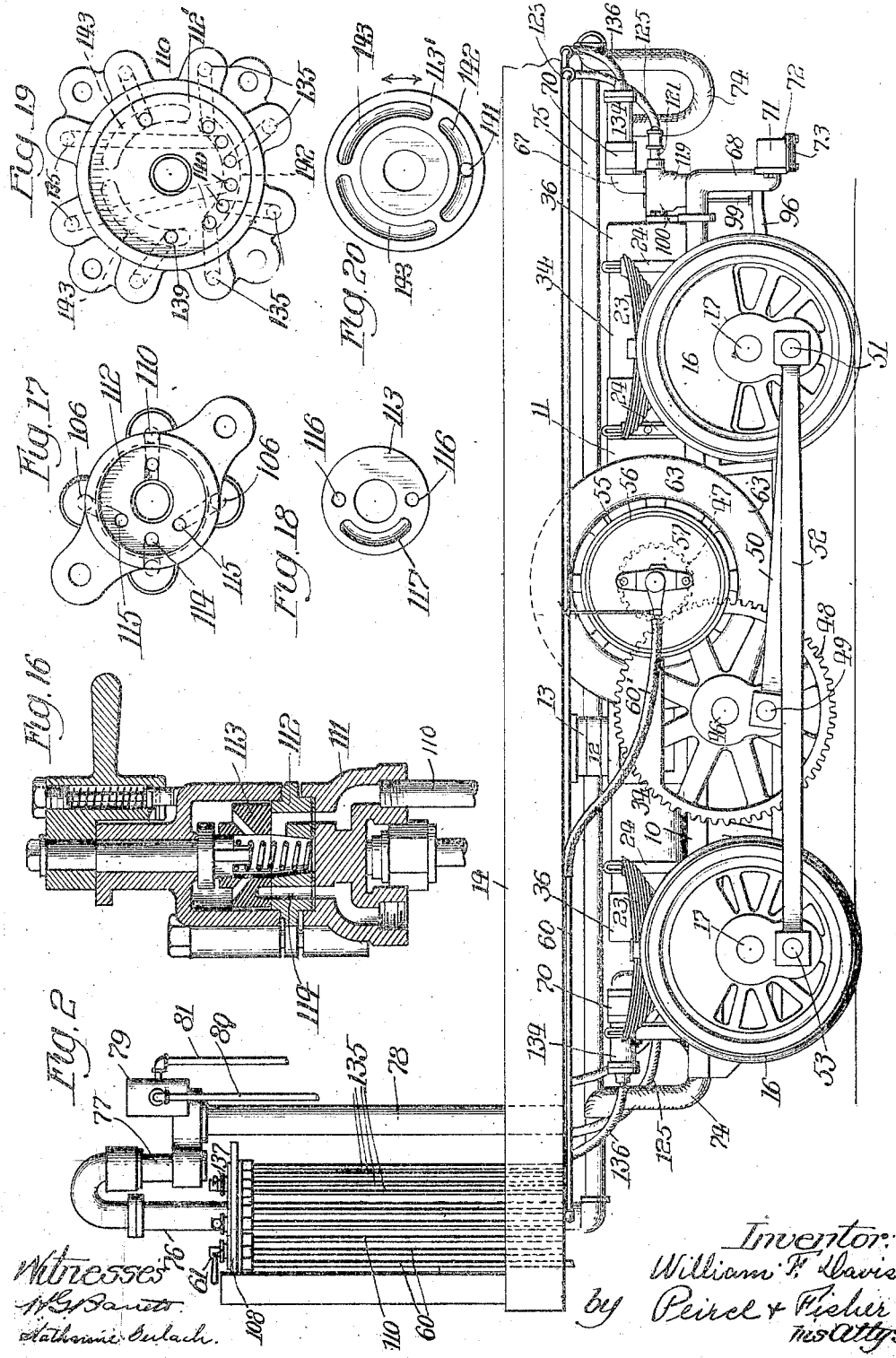

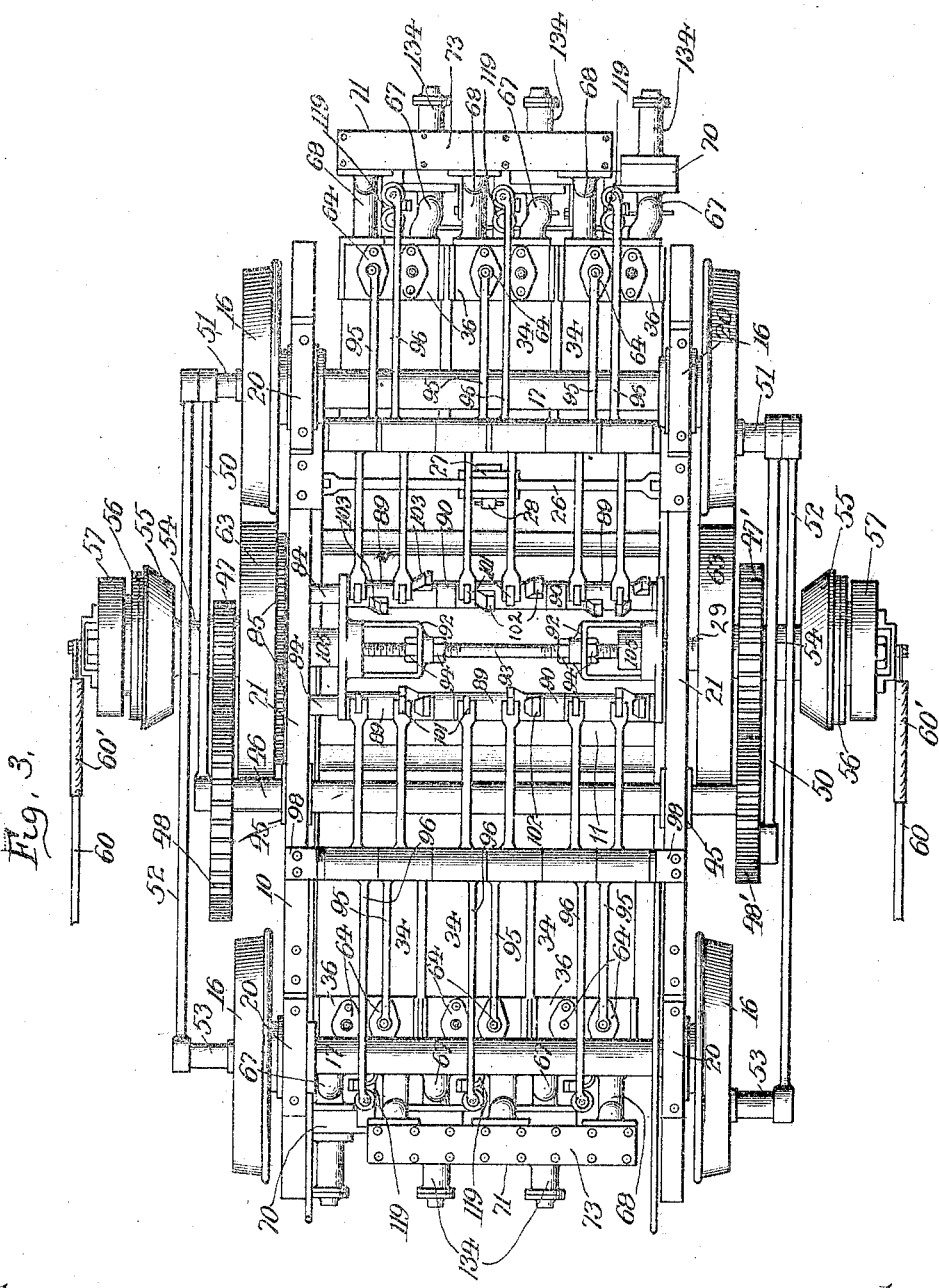

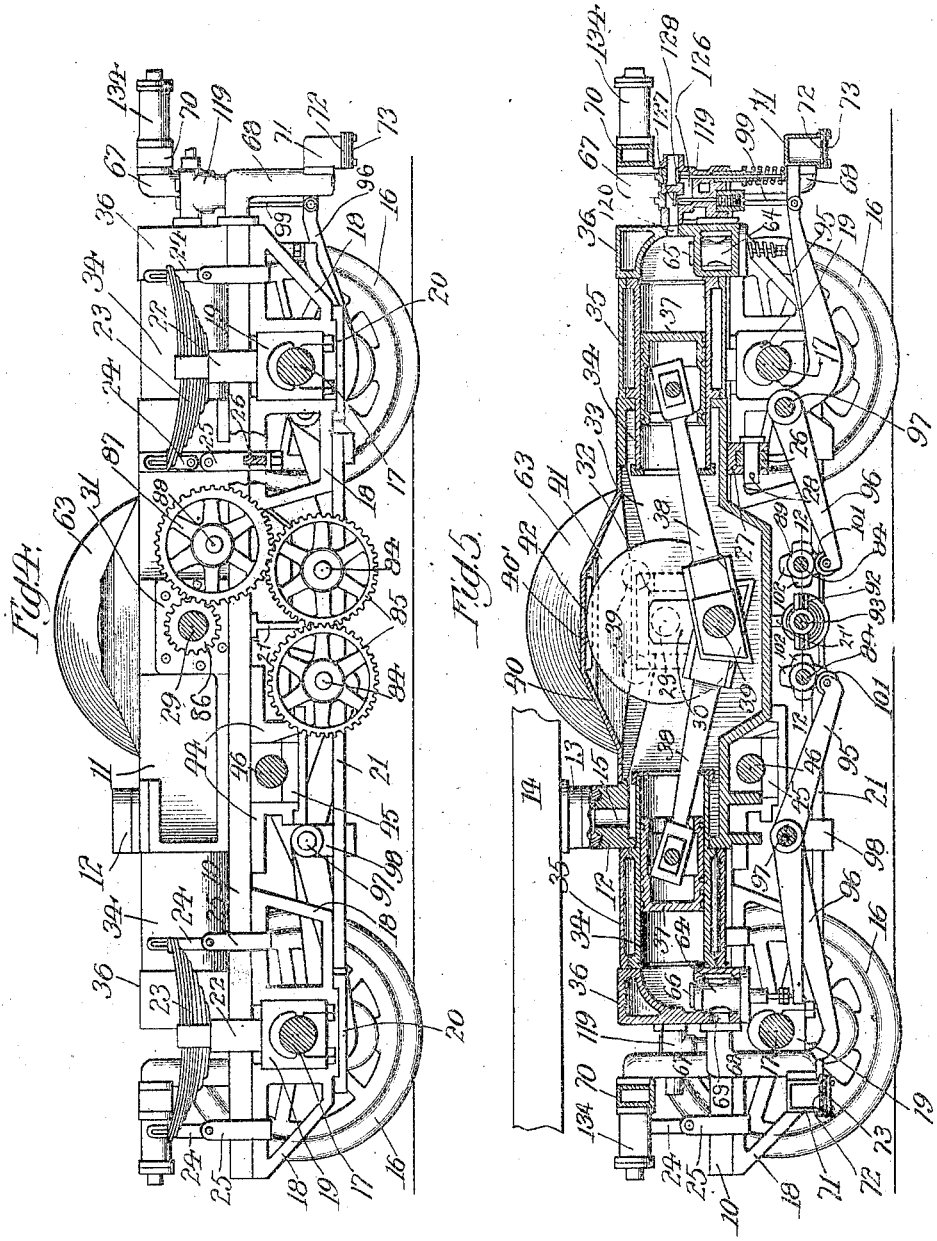

W. F. DAVIS.
EXPLOSION MOTOR FOR CARS AND THE LIKE.
APPLICATION FILED OCT. 10, 1905.
1,079,220.
Patented Nov. 18, 1913.
7 SHEETS—SHEET 5.
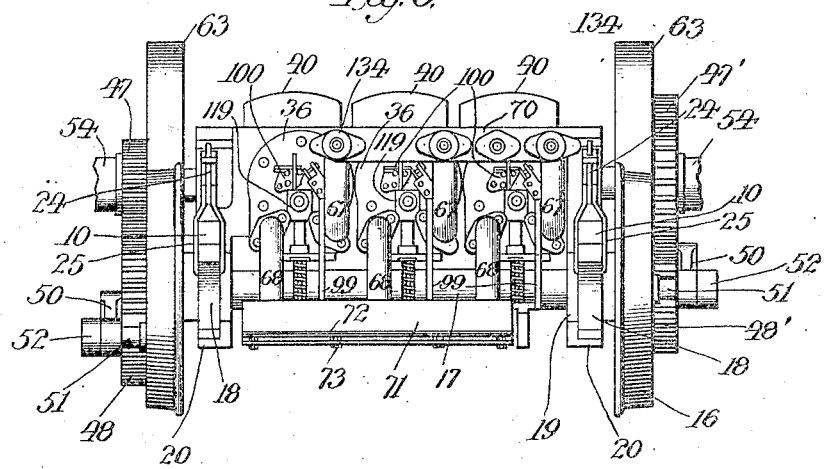
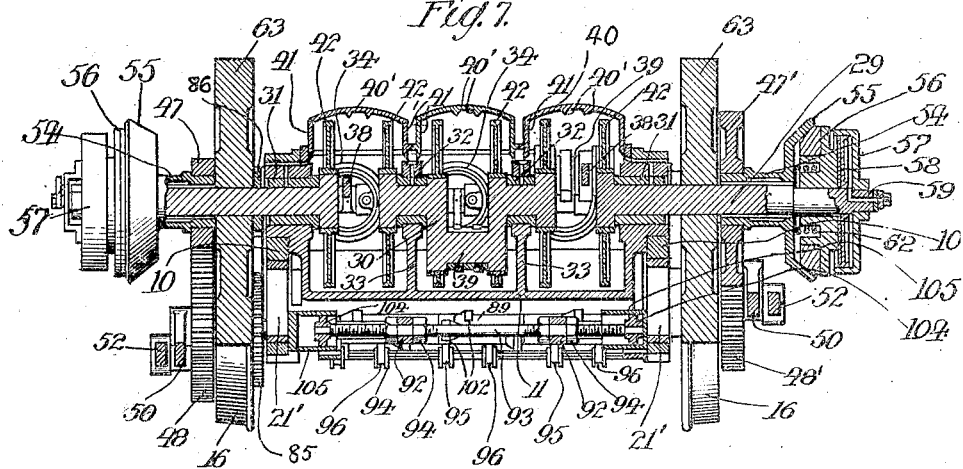
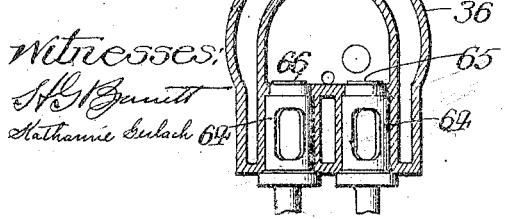

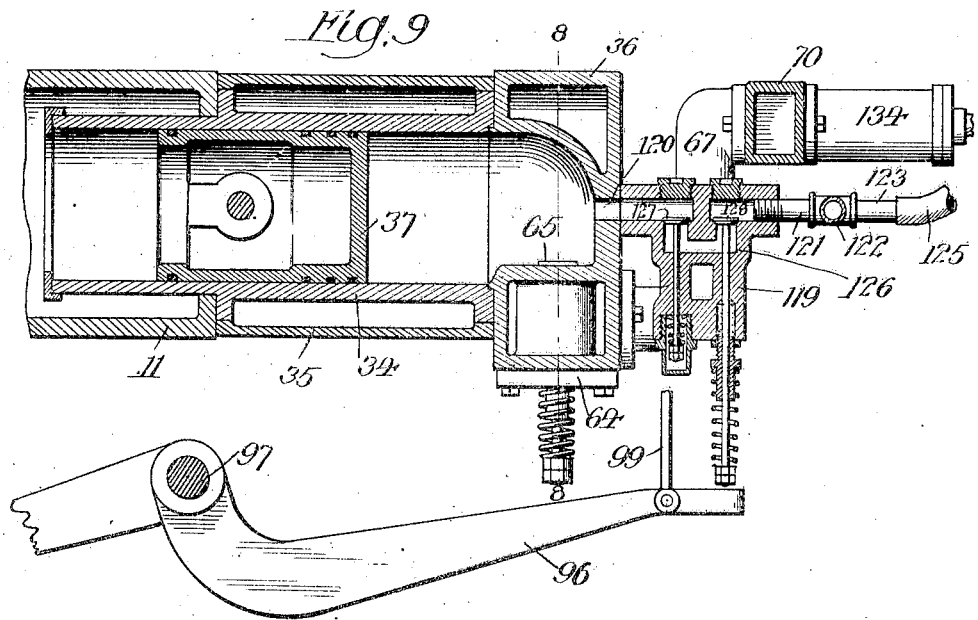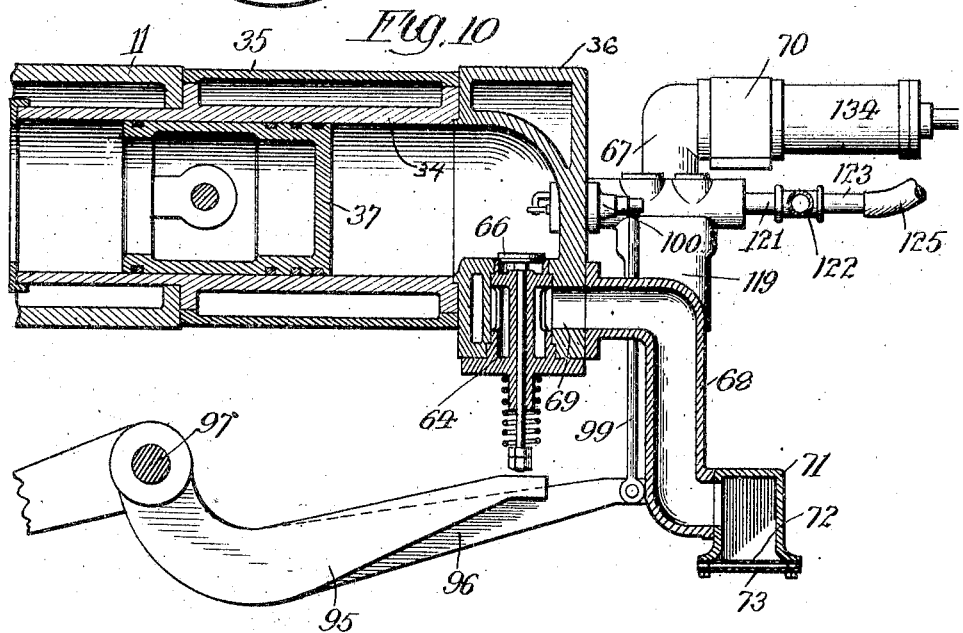

W. F. DAVIS.
EXPLOSION MOTOR FOR CARS AND THE LIKE.
APPLICATION FILED OCT. 10, 1905.
1,079,220.
Patented Nov. 18, 1913.
7 SHEETS—SHEET 7.
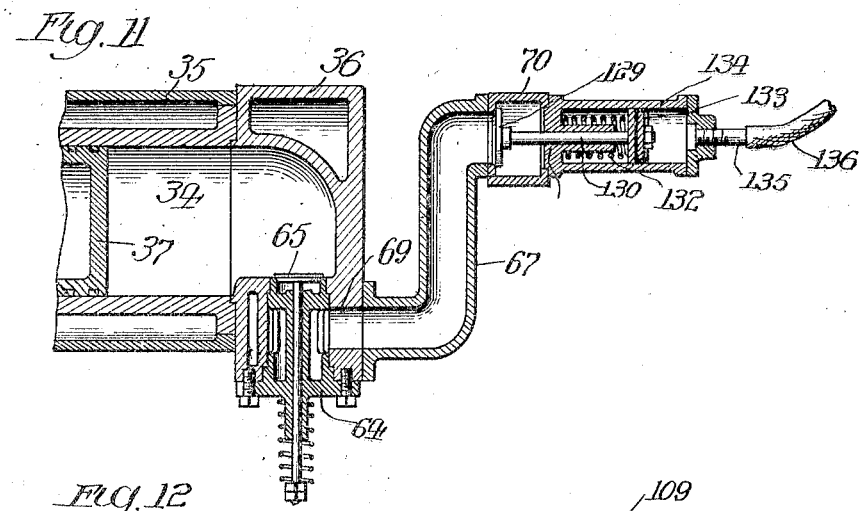
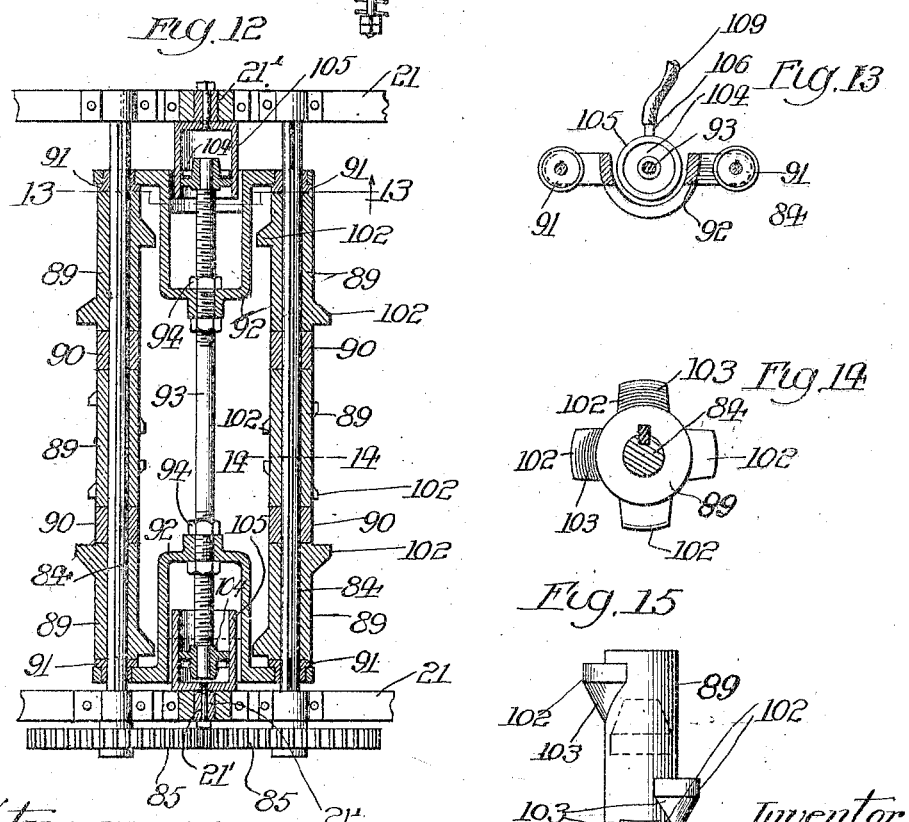

UNITED STATES PATENT OFFICE.

WILLIAM F. DAVIS, OF KANSAS CITY, KANSAS, ASSIGNOR TO McKEEN MOTOR CAR COMPANY, A CORPORATION.

EXPLOSION-MOTOR FOR CARS AND THE LIKE.

1,079,220.   Specification of Letters Patent.   Patented Nov. 18, 1913.

Application filed October 10, 1905. Serial No. 282,153.

*To all whom it may concern:*

Be it known that I, WILLIAM F. DAVIS, a citizen of the United States, and a resident of Kansas City, county of Wyandotte, and State of Kansas, have invented certain new and useful Improvements in Explosion-Motors for Cars and the like, of which the following is declared to be a full, clear, and exact description.

The invention relates to explosion motors or locomotives for cars and the like and seeks to provide an effective arrangement of explosion motor which is mounted upon the truck of the car and suitably connected to the wheels of the truck, together with means by which the operation of the motor may be suitably controlled by the motorman on the car.

The particular object of the invention is to provide a suitable explosion motor for the self-propulsion of railway and street cars.

With these objects in view, the invention consists in the features of construction, combinations and arrangements of parts hereinafter set forth, illustrated in the accompanying drawings and more particularly pointed out in the appended claims.

In the drawings, Figure 1 is a plan view of the improved motor, the outline of the car-body being indicated in dotted lines. Fig. 2 is a side elevation of the same. Fig. 3 is an inverted plan view. Figs. 4 and 5 are longitudinal sections taken respectively on lines 4—4 and 5—5 respectively of Fig. 1. Fig. 6 is an end view. Fig. 7 is a cross-section on line 7—7 of Fig. 1. Fig. 8 is a detail section through one of the engine cylinders taken on line 8—8 of Fig. 9. Fig. 8ᵃ is a side view of one of the oiling disks. Fig. 9 is a longitudinal section through the central part of one of the engine cylinders. Fig. 10 is a longitudinal section of one of the engine cylinders taken through the exhaust valve. Fig. 11 is a similar view taken through the inlet valve. Fig. 12 is a detail section of the valve operating mechanism taken on line 12—12 of Fig. 5. Figs. 13 and 14 are detail sections taken on lines 13—13 and 14—14 respectively of Fig. 12. Fig. 15 is a plan view of one of the cam sleeves. Fig. 16 is a sectional view of one of the controlling valves. Fig. 17 is a plan view of the seat of the reversing valve. Fig. 18 is an inverted plan view of the reversing valve. Fig. 19 is a plan view of the cut-out valve seat. Fig. 20 is an inverted plan view of the cut-out valve.

In the drawings, which illustrate the preferred form of the invention, the motor is shown mounted upon a bogie truck located beneath the forward end of a heavy railway or street car. For shorter cars, or for locomotives, a single four-wheeled truck carrying the motor may be employed, the car-body being rigid with the truck or spring mounted thereon.

The truck comprises the side bars 10 which support and which are connected by a heavy casting 11. This casting is preferably in the form of a hollow crank casing and at its forward end is provided with a bolster 12. The bolster 13 fixed to the car-body 14 rests upon the bolster 12 of the truck and is connected or swiveled thereto by a king-bolt 15 (see Fig. 5). The truck is carried upon two pairs of wheels 16 fixed to the axles 17. Brackets 18 fixed to and depending from the side bars 10 of the truck form guides upon which the axle-boxes 19 are vertically shiftable. The brackets of each pair are connected at their lower ends by a bridge-piece 20, and the inner brackets on each side of the truck are connected together by a longitudinally extending brace-bar 21. Side bars 10 and 21 are connected by brace pieces 21′. Saddles 22 extend over the side bars and rest upon the axle-boxes 19. The upper end of each of these saddles is connected to the central portion of a series of leaf springs 23. The truck is hung from the ends of these springs by links 24 secured at their lower ends to straps 25 that extend around the side bars 10 and brackets 18, (see Figs. 4 and 6.) The forward ends of the rear springs 23 are connected by links 24 to the ends of a transverse equalizing bar 26 (see Figs. 3 and 5), and this bar is centrally connected to a U-shaped lug 27 on the underside of the casting 11 by a bolt 28. By the described arrangement, the truck is suitably spring-supported from the wheel axles.

The main power or engine crank-shaft 29 is mounted within the crank casing 11 and is provided with a plurality of cranks 30. In the form shown, there are three of these cranks set 120° apart. The main journal-boxes 31 for the ends of the crank-shaft are mounted upon the side portions of the crank 11 casing just above the side bars 10 of the truck, (see Fig. 7.) Supplemental bearings 32 for the engine-shaft are carried upon longitudinally extending ribs 33 arranged within the crank-casing between the several cranks 30. Several power cylinders 34 are arranged in horizontal position on the truck. In the form shown, six of these cylinders are employed, three on each side of the power shaft. The inner ends of the cylinders extend through openings in the ends of the crank-casing 11 (see Fig. 5), and are securely bolted thereto. The outer portions of the cylinders are provided with suitable water-jackets 35 and heads 36 are bolted to the ends of the cylinders. The pistons 37 within the cylinders are connected by pitman rods 38 to the several crank-pins 39 of the main shaft. The pistons of each oppositely disposed pair of cylinders are connected to the same crank-pin, and for this purpose the cylinders of each pair are arranged slightly out of line, as shown in Fig. 1, so that the corresponding pitman rods may be properly connected to the same crank-pin. The upper portion of the crank-casing is closed by a set of three removable cover-plates 40 having raised central portions provided with beveled ribs 40* and depending side flanges 41 having beveled lower edges (see Figs. 5 and 7). The outer side flanges 41 rest upon the sides of the crank-casing 11 and the intermediate flanges 41 extend downwardly closely adjacent the upper edges of the longitudinal ribs 33. The lower edges of the intermediate flanges 41 and the upper edges of the ribs 33 are inclined downwardly toward the crank-shaft, as shown in Fig. 5, and the upper edges of the ribs are provided with grooves (see Fig. 7) which conduct oil dripping from the side flanges 41 to the bearings 32 of the crank-shaft. The lower portion of the crank casing extends downwardly, as shown, and is adapted to contain oil. A series of disks 42, having rectangular openings, (see Fig. 8ᵃ) set over the cranks 30 and serve to distribute the oil over the bearings of the engine-shaft and over the bearings at the ends of the pitman rods 38. A pair of these disks, as shown in Fig. 7, are secured to each cranked portion of the engine-shaft on opposite sides of each crank-pin 39. The disks also serve to lubricate the engine cylinders so that all parts of the engine are automatically oiled. This is an important feature, since, with the engine located on the truck beneath the car-body, it is quite inaccessible for oiling in the ordinary manner.

Brackets 44, Fig. 4, depending from and secured through side bars 10 of the truck in front of the main shaft, carry the journal-boxes 45 of the transverse counter-shaft 46. Two sets of gears 47, 48 and 47′, 48′ are mounted upon the ends of the engine and counter-shafts, (see Fig. 1). The gears 48 and 48′ are fixed to the ends of the counter-shaft and are provided with eccentric or crank-pins 49 that are connected by pitman rods 50 with eccentric or crank pins 51 on the rear pair of truck wheels, (see Fig. 2.) Parallel rods 52 connect the crank-pins 51 on the rear pair of truck wheels with crank-pins 53 on the forward pair of truck wheels. This connection between the engine-shaft and truck wheels permits the up and down movement of the truck and car upon the wheels without interfering with the proper operation of the engine and pistons connected thereto. The two sets of gears 47, 48 and 47′, 48′ are of different sizes and the gears 47 and 47′ (see Figs. 1 and 7) are fixed to the inner ends of sleeves 54 that are loosely mounted upon the ends of the main power shaft. Cup-shaped clutch-disks 55 are fixed to the outer ends of the sleeves 54 and releasable clutch-members 56 are keyed to the shaft so as to be shiftable thereon into and out of engagement with clutch-disks 55. Short cylinders 57 are fixed to the end of the engine shaft and are provided with pistons 58 that are connected to the releasable clutch-members. Ports 59, extending through the shaft, communicate with each of the cylinders and pipes 60 having flexible portions 60′ lead from the ports 59 to a suitable controlling valve 61 (see Fig. 1) on the body of the car. By operating the valve either one of the clutches may be thrown into operation, so that the engine may be coupled to the truck wheels to drive the same with different speeds and with different power. The releasable clutch-members 56 are shiftable outwardly away from the disks 55 by coil-springs 62 arranged between these parts (see Fig. 7).

The engine-shaft 29 is provided with a pair of heavy fly-wheels 63 fixed thereto just inside the gears 47 and 47′, so as to steady the operation of the engine when both clutches are disengaged.

The head 36 of each cylinder (see Fig. 8) is provided with openings in its lower portion within which are arranged the valve-casings 64 of the inlet and exhaust valves 65 and 66. These valves are of the usual spring-held puppet type and are arranged to shift in vertical direction to open and close the inlet and exhaust ports. An inlet pipe 67 and an exhaust pipe 68 (see Figs. 6, 10 and 11) are bolted to the end of each cylinder head over openings 69 therein which communicate respectively with the inlet and exhaust valve-casings. The inlet pipes 67 of the three cylinders at each end of the truck extend upwardly and connect to the side of a common inlet header 70, the header being supported upon the pipes. The exhaust pipes 68 of the series of cylinders extend downwardly and open into the side of a common exhaust header 71 that is bolted to and supported upon the ends of the exhaust pipes. The lower portion of the exhaust header (see Fig. 10) is covered by a perforated plate 72 that serves to muffle the exhaust. A deflecting plate 73 is preferably secured in place below the perforated plate 72, but is somewhat separated therefrom, as shown. Deflecting plate 73 prevents the direct downward discharge of the exhaust which would otherwise raise the dust. Each inlet-header 70 is connected by a flexible pipe section 74 (see Figs. 1 and 2) to branches 75 of a common supply-pipe 76. The supply-pipe 76 and branch-pipes 75 are mounted upon the bottom of the car-body. Supply-pipe 76 extends to the forward vestibule of the car and thence upwardly through the platform to a suitable mixer or vaporizer 77 so arranged that it may be conveniently controlled by the motorman. The mixer or vaporizer is supplied with air pipe 78 rising upwardly through the platform of the car. Either oil or gas may be employed to form the explosive mixture. If oil is used, a small oil reservoir 79 will be mounted adjacent the vaporizer and will be provided with a supply-pipe 80, an overflow pipe 81 and a pipe 82 (see Fig. 1) leading to the mixer and controlled by a throttle-valve 83. By the arrangement described the motor fluid is supplied to all of the cylinders of the engine.

For convenience in the arrangement of the parts, two valve operating shafts are employed, one for each of the sets of cylinders, at opposite ends of the truck. These valve-operating shafts 84 (see Figs. 3, 4 and 12) are mounted in suitable bearings upon the longitudinal brace-bars 21 of the truck and are provided on one end with intermeshing gears 85. The gears 85 are twice the size of a pinion 86 on the engine shaft and are driven at one-half the speed of the engine shaft through the medium of an intermediate idler 87 meshing with the pinion 86 and with one of the gears 85. The idler 87 revolves on stud shaft 88 carried upon the adjacent side bar 10 of the truck. Each of the shafts 84 is provided with a series of cam-sleeves 89. In the form shown there are three of these cam-sleeves on each shaft, one for each of the engine cylinders. These sleeves are splined to the shaft and are held apart by intermediate collars 90. The end cam-sleeves abut against collars 91 arranged within the ends of a pair of yokes 92 and a cam-shifter rod 93 extends through the central portion of the yokes and is removably secured thereto by nuts 94 threaded on the rod on opposite sides of the yokes. As stated, the cam-sleeves 89 are splined to the shafts 84 so as to revolve therewith, but are free to be shifted longitudinally thereon to reverse the engine. The shifter-rod 93 serves to simultaneously move all of the cam-sleeves in one or the other direction. Each cylinder is provided with a shifter 95 (see Figs. 3 and 5) for operating the exhaust valve and a shifter 96 for operating the igniter. The shifters are preferably in the form of rocking levers journaled upon cross-shafts 97 that are mounted in brackets 98 secured to the longitudinal brace-bars 21 of the truck (see Fig. 4). The outer ends of the rock levers 95 are arranged beneath the stems of the exhaust valve 66 (see Fig. 10) and the outer ends of the rock levers 96 are provided with vertically and upwardly extending rods or links 99 which serve to operate suitable igniters 100, having electrodes that are brought together and separated in any well-known or desired manner by igniter operating rods 99. The inner ends of the rock levers 95 and 96 are provided with rollers 101 and arranged to engage cam-points 102 on the cam-sleeves 89. Each cam-sleeve 89 is provided with four cam-points, two for operating each rocker in the forward and reversed position of the valve mechanisms respectively. The two cam-points coöperating with each rocker are provided on their adjacent faces with inclined portions 103, so that the shift of the cams to bring one or the other cam-points beneath the end of the rock lever may be properly effected. The cam-points are, of course, so arranged that they will operate the exhaust valves and igniters of the several cylinders in proper order, either in forward or reversed position.

The reversing rod 93 is preferably shifted by fluid pressure under control of a valve in the front vestibule of the car. For this purpose the ends of the shifter-rod are provided with pistons 104 arranged within short, open-ended cylinders 105 fixed to the brace-piece 21' of the truck. Pipes 106 (see Fig. 1) lead from the cylinders 105 to a suitable controlling valve 107 that is mounted on a board 108 arranged in the front vestibule of the car within easy reach of the motorman. Pipes 106 are provided with flexible sections 109 to permit the slight independent movement of the car and truck. Valve 107 is of multi-way type and is connected by a pipe 110 to a source of fluid, preferably air, under pressure. The multi-way valve may be of any suitable form, but it should be so arranged that either one of the cylinders 105 is connected to the source of supply, while the other is connected to the exhaust, so as to shift and hold the valve mechanism either in its forward or reversed position. A suitable construction for this valve is illustrated in Figs. 16, 17 and 18. In this form the supply from pipe 110 is led up through suitable ports in the valve-body 111, valve-seat 112 and disk-valve 113 to the upper side of the valve. The valve-seat (see Fig. 17) is provided with an exhaust port 114 and with ports 115 leading to the pipes 106. The valve 113 (see Fig. 18) is provided with admission ports 116 extending therethrough and on its underside with an exhaust channel 117. The valve may be shifted either to its reversed or forward position and in either position will connect one of the cylinders 105 to the source of supply and the other to the exhaust, so that the valve mechanism may be readily set to permit the forward or backward operation of the motor. In an explosive car motor that is reversed in this manner, it is essential that some suitable starting means should be employed. With a heavy motor of this type, located upon the car truck, it would be impracticable to employ a hand-crank or other similar device for this purpose. The engine is, therefore, preferably started by means of fluid—preferably air under pressure, and valves are arranged to suitably control the admission of the air at proper intervals through the cylinders. For this purpose, a valve casing 119 (see Fig. 9) is secured to the rear face of each cylinder head 36 over an opening 120 therein. The three valve-casings at each end of the motor are connected by short branch pipes 121 to a common pipe 122 (see Fig. 1) and pipe 121 is connected by pipes 123 to a controlling valve 124. Pipe 123 is provided with flexible sections 125. Valve 124 is a simple cut-off valve for opening and closing the communication between the several valve casings 119 and the main air supply pipe 110. The passage through each valve casing 119 (see Fig. 9) is provided with a U-shaped portion 126, the upper ends of which are provided with valve-seats for the vertically disposed puppet valves 127 and 128. These valves are spring-held to their seats in a manner usually employed with valves of this type. The inner valve 127 is a simple check-valve for preventing the back flow of the exploded gases under pressure through the valve-casings 119. Valve 128 is an inlet valve for the air and is operated in proper time by the igniter rock lever 96, the rear end of which extends below the end of the stem of this valve. The air valves 128 of the several cylinders are, therefore, always operated in proper time to admit air to the cylinders, whether the valve mechanism is set either in its forward or reversed position. The air, however, is only admitted to the cylinders when the controlling valve 124 places the several valve casings 119 into communication with the source of compressed air.

In the present construction six single acting cylinders of the four-cycle compression type are employed as described, three on each side of the engine shaft, and connected to three cranks at 120° apart. A larger number of cylinders may be employed, if desired, connected to the crank and properly spaced upon the engine shaft. It is desirable, however, with this arrangement, that at least six be used in order that there shall be no dead center. With the present construction of valve operating mechanism at least one of the air valves 128 will be open in any position of the valve operating devices. In order to start the car it is only necessary, therefore, that the valve 107 should be set to hold the valve operating devices either in forward or reversed position, as desired, and to open the valve 124. Air will then be admitted to at least one of the cylinders and the engine will start in either direction and will continue to run under the air pressure through the operation of the air inlet valves 128 and exhaust valves 66 until the necessary momentum is acquired. Preferably, of course, the clutches are disengaged while starting the engine. Other forms of air admission valves may be employed, if desired.

The admission headers 70 for the explosive mixture are provided with valve seats (see Fig. 11) opposite the ends of the inlet pipes 67 and valves 129 arranged to close the communication between the admission header and the several cylinders. These valves are preferably of the puppet type and are provided with stems 130 extending through suitable supports 131 bolted to the outer face of the header. Springs 132 coiled about the support for the valve stem are arranged to normally hold the valves in open position. These valves are preferably operated by fluid pressure under the control of the motorman, so that the cylinders may be thrown into and out of communication with the admission headers, in order. For this purpose the valve stems are provided with pistons 133 arranged within the cylinders 134 formed in piece with the valve supports. These cylinders (see Fig. 1) are connected by pipes 135, having flexible sections 136, to a common controlling valve 137 that is arranged on the board 108 in the front vestibule of the car. Multi-way valve 137 is connected to the main supply pipe 110 and may be of any suitable form, but should be arranged to connect the fluid pressure operating devices of the several cut-out valves to the sources of supply and to the exhaust pipes, in order that the several cylinders of the engine may be placed in operative communication with the explosive mixture supply, or cut out one after the other. A valve similar in construction to the reversing valve shown in Fig. 16, may be employed, except that the arrangement of the ports is necessarily changed, as shown in Figs. 19 and 20. In the cut-out valve shown in these figures, the valve-seat 112' is provided with an inlet port leading from the main supply pipe 110 to the upper side thereof, in a manner similar to the analogous port shown in Fig. 16. The valve-seat is also provided with an exhaust port 139 and with a series of segmentally arranged ports 140 communicating with the several pipes 135. The disk valve 113' is provided with an inlet port 141 extending therethrough and communicating with a segmental channel 142 on its under face. The valve is also provided with two segmental exhaust channels 143 on its under face. In the position of these channels, indicated in dotted lines in Fig. 19, all of the cut-out cylinders will be placed in communication with the air supply and the communication between all of the cylinders and the inlet headers 70 will be interrupted. As the valve is turned in the direction of the arrow, the several fluid pressure devices for controlling the cut-out valves 129 will be cut off, one after another, from the source of their supply and will be placed in similar order in communication with the exhaust port of the valve, so that the valves 129 will be shifted by their springs to throw one cylinder after the other into operation. By reversing the movement of the valve, the cylinders will be thrown out of operation in the reverse order. By having two exhaust channels 143, the valve may be turned in either direction from central position, to throw the cylinder into operation in one or another order.

In starting the car, the motorman will shift the valve 61 to mid position to throw out both of the clutch members 56, will set the valve 107 to its forward or reversed position, as desired, open the air valve 124 and the engine will then be operated for a brief necessary interval by the air under pressure. When sufficient momentum is acquired, the air valve 124 is closed and one or more of the cylinders, as desired, placed in communication with the source of explosive mixture by manipulating the controlling valve 137. Either one of the clutches may then be brought into operation by shifting the valve 61. The speed may be changed by shifting one or the other of the clutches into operation and by shifting the controlling valve 137 to throw the desired number of engine cylinders into operation. The car may be stopped by throwing out the clutch and applying a suitable brake. The motor may be stopped by shifting the controlling valve 137 to cut out all of the cylinders, or by shutting off all of the supply of explosive gas from the mixer 77.

It is obvious that numerous changes may be made in the details of construction without departure from the essentials of the invention, as set forth in the claims.

Having described my invention, what I claim as new, and desire to secure by Letters Patent, is:—

1. In apparatus of the class described, in combination, a pair of truck side bars, a rigid integral casting bridging said side bars, a crank shaft journaled in said casting, a multi-cylinder engine connected with said crank shaft and having its cylinders horizontally mounted on said truck, and means adapted to drive said truck from said crank shaft.

2. In apparatus of the class described, in combination, a pair of truck side bars, a rigid integral casting bridging said side bars and interlocking therewith, bearing supports formed in said casting integral therewith, a crank shaft journaled upon said bearing supports, a multi-cylinder engine connected with said crank shaft and having its cylinders mounted on said truck, and means adapted to drive said truck from said crank shaft.

3. In apparatus of the class described, in combination, a pair of truck side bars, supporting means extending across said side bars and substantially below the upper surface thereof, an engine mounted upon said supporting means and having its crank shaft journaled thereon, and means adapted to drive the truck from said crank shaft.

4. In apparatus of the class described, in combination, a pair of truck side bars, an integral casting extending across and substantially below the upper surface of said side bars, an engine having its crank shaft mounted upon said casting, and means adapted to drive the truck from said crank shaft.

5. In apparatus of the class described, in combination, a pair of truck side bars, an integral casting fitted between and extending over said side bars and substantially below the upper surface thereof, an engine having its crank shaft journaled upon said casting, and means adapted to drive the truck from said crank shaft.

6. In apparatus of the class described, in combination, a pair of truck side bars, a rigid integral casting bridging said side bars and substantially below the upper surface thereof, a crank shaft journaled in said casting, a multi-cylinder engine connected with said crank shaft and having its cylinders horizontally mounted on said truck, and means adapted to drive the truck from said crank shaft.

7. In apparatus of the class described, in combination, a pair of truck side bars, supporting means extending across and substantially below the upper surface of said side bars, an engine having its crank shaft mounted upon said supporting means, said crank shaft extending below the upper surface of said side bars, and means adapted to drive the truck from said crank shaft.

8. In apparatus of the class described, in combination, a pair of truck side bars, an engine support bridging said side bars, a crank shaft journaled upon said support, a multi-cylinder engine mounted with sets of cylinders facing said crank shaft upon opposite sides thereof, and means adapted to drive the truck from said crank shaft.

9. In apparatus of the class described, in combination, a car truck, an internal combustion engine cylinder mounted upon said truck, a crank shaft connected with said cylinder, means adapted to drive the truck from said crank shaft, and valve gearing for said cylinder mounted upon the truck beneath the engine.

10. In apparatus of the class described, in combination, a car truck, an internal combustion engine mounted upon said truck, means adapted to drive the truck from said engine, and valve gearing for said engine horizontally offset therefrom and accessible from the end of the truck.

11. In apparatus of the class described, in combination, a car truck, an internal combustion engine mounted upon said truck, means adapted to drive the truck from said engine, and valve gearing for said engine positioned beneath the same and extending to a point horizontally offset from said engine and accessible from beneath and from one end of the truck.

12. In apparatus of the class described, in combination, a car truck, an internal combustion engine mounted upon said truck, means adapted to drive the truck from said engine, valves for said engine positioned at one side thereof, and valve-actuating mechanism positioned beneath said engine and accessible from beneath the truck.

13. In apparatus of the class described, in combination, a car truck comprising a pair of side bars, an engine support bridged across said side bars, an internal combustion engine mounted horizontally upon said support, and valve gearing for said engine mounted upon said truck beneath said engine.

14. In apparatus of the class described, in combination, a car truck, an internal combustion engine mounted upon said truck comprising a crank shaft and a horizontally positioned cylinder, means adapted to drive the truck from said crank shaft, and valve gearing leading from said crank shaft beneath said engine.

15. In apparatus of the class described, in combination, a car truck, an internal combustion engine mounted upon said truck comprising a crank shaft and a pair of cylinders upon opposite sides of said crank shaft, means adapted to drive the truck from said crank shaft, and valve gearing beneath the engine leading from said crank shaft respectively to said cylinders.

16. In combination with a vehicle to be propelled and provided with a wheel shaft or axle to be driven, an internal combustion engine comprising a main frame, a crank shaft, and two groups of oppositely disposed cylinders on opposite sides of said crank shaft, there being a plurality of cylinders in each group; valves adjacent the heads of said cylinders; a pair of cam shafts located respectively on opposite sides of the crank shaft, and each provided with cams for actuating the valves of the corresponding group of cylinders; levers intermediate the respective cams and valves, and serving to transmit motion from the former to the latter; and connections between the crank shaft of the engine and the shaft or axle of the vehicle to be driven, substantially as set forth.

17. In apparatus of the class described, in combination, a car truck, an internal combustion engine mounted upon said truck and comprising a crank shaft and a horizontally disposed cylinder, a valve mounted adjacent the head of said cylinder, a cam shaft driven from said crank shaft, and a lever beneath said engine leading from said crank shaft to said valve to actuate the same.

18. In apparatus of the class described, in combination, a car truck, a car body mounted upon said truck, an internal combustion engine upon said truck, means adapted to drive said truck from said engine, fluid-actuated means adapted to stop said engine, and a valve positioned upon said body and controlling said fluid-actuated means.

19. In combination with a car truck and a car body thereon, an internal combustion engine carried upon the truck; driving-connections mounted between the engine and the truck wheels; a fuel supply duct carried by the truck; a valve controlling communication between said duct and the engine cylinder; a fluid pressure device connected with and serving to control said valve; a source of fluid pressure; a valve mounted on the body of the vehicle; and connections between the source of supply and the valve on the car body, and between said valve and the fluid pressure device associated with the fuel supply valve on the truck; whereby said fuel supply valve may be controlled through manipulation of the valve on the car body.

20. In combination with a car truck and a car body mounted thereon, a multicylinder internal combustion engine carried upon said truck; connections between the engine and the truck wheels whereby motion is imparted to the latter; a fuel supply trunk carried by the truck; valves carried by the truck, and serving to control delivery of fuel from said trunk to the engine cylinders; fluid pressure cylinders and pistons, one for each of said valves, whereby said valves may be closed to prevent delivery of fuel to the cylinders; a valve mounted upon the car body; and flexible connections between the valve on the car body and the valve-controlling fluid pressure cylinders on the truck; whereby through manipulation of the valve on the car body the supply of fuel to the respective engine cylinders may be controlled.

21. In combination with a car truck and a car body mounted thereon, a multicylinder internal combustion engine carried upon said truck; connections between the engine and the truck wheels whereby motion is imparted to the latter; a fuel supply trunk carried by the truck; valves carried by the truck, and serving to control delivery of fuel from said trunk to the engine cylinders; fluid pressure cylinders and pistons, one for each of said valves, whereby said valves may be closed to prevent delivery of fuel to the cylinders; a valve mounted upon the car body, adapted to establish communication according to adjustment with any one or more of the fluid pressure cylinders on the truck, and thus to cut off or establish communication between the fuel supply and any one or more of the engine cylinders; and flexible connections between the valve on the car body and the valve-controlling fluid pressure cylinders on the truck.

22. In apparatus of the class described, in combination, a car truck, a car body mounted upon said truck, an internal combustion engine mounted upon said truck, a longitudinally shiftable cam shaft controlling the valve gearing of said engine, fluid-actuated means adapted to shift said cam shaft, and means controlled within said car body and controlling said shifting means.

23. In truck construction, in combination, a pair of side bars, a rigid casting interposed therebetween and extending along the same for a substantial portion of the length thereof and secured to each of the same, bearings upon said casting, an engine mounted upon said casting and having its crank shaft journaled in said bearings, and means adapted to drive the truck from said engine.

24. In truck construction, in combination, a pair of side bars, a rigid integral casting interposed therebetween and extending along the same for a substantial portion of the length thereof and secured to each of the same, a multiple cylinder engine mounted upon said casting, bearings for the crank shaft of said engine upon said casting and between each of the cylinders of the engine, and means adapted to drive the truck from said engine.

25. In truck construction, in combination, a pair of side bars, a casting fitted between the same comprising a pair of substantially vertical portions and means connecting said portions one with another, said casting extending along said side bars for a substantial portion of the length thereof, a multiple cylinder engine mounted upon said casting, bearings upon said casting between each of the cylinders of said engine and having journaled therein the crank shaft thereof, and means adapted to drive the truck from said engine.

26. In truck construction, in combination, a pair of truck side bars, a rigid casting fitted between and secured at its ends to said side bars, an engine mounted upon said casting and having its crank shaft disposed transversely of the truck, and means driven from said engine adapted to drive the truck.

27. In truck construction, in combination, a pair of side bars, a rigid casting interposed therebetween and provided with portions extending parallel to said side bars and secured thereto throughout their length, an engine mounted upon said casting, bearings upon said casting in which the crank shaft of said engine is journaled, and means adapted to drive the truck from said engine.

28. In truck construction, in combination, a pair of side bars, a rigid integral casting interposed therebetween and provided at each end with a flange extending parallel to the corresponding side bar and secured to the inner surface thereof, an engine mounted upon said casting, bearings upon said casting in which the crank shaft of said engine is journaled, and means adapted to drive said truck from said engine.

29. In truck construction, in combination, a pair of side bars, a rigid casting interposed therebetween and provided with upwardly extending portions disposed transversely of the truck and upwardly extending portions at each end extending parallel to and secured to said side bars, an engine having its crank shaft journaled between said several upwardly extending portions, and means adapted to drive the truck from said engine.

30. In truck construction, in combination, a pair of side bars, a casting fitted between the same and comprising a pair of substantially vertical portions disposed transversely of the truck and having at its ends flanges adapted to rest upon said side bars, an engine mounted upon said casting, and means adapted to drive the truck from said engine.

31. In truck construction, in combination, a pair of side bars, a casting fitted between the same and comprising a pair of substantially vertical portions disposed transversely of the truck and having at its ends flanges adapted to rest upon said side bars, an engine mounted upon said casting, means adapted to drive the truck from said engine, and bearings upon said casting in which the crank shaft of said engine is journaled.

WILLIAM F. DAVIS.

Witnesses:
KATHARINE GERLACH,
LILLIAN PRENTICE.